US009298027B2

(12) United States Patent
Shin et al.

(10) Patent No.: US 9,298,027 B2
(45) Date of Patent: Mar. 29, 2016

(54) LIQUID CRYSTAL DISPLAY DEVICE

(71) Applicants: Eun Ju Shin, Yongin (KR); Joo Young Lee, Yongin (KR)

(72) Inventors: Eun Ju Shin, Yongin (KR); Joo Young Lee, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 91 days.

(21) Appl. No.: 13/935,651

(22) Filed: Jul. 5, 2013

(65) Prior Publication Data

US 2014/0146272 A1 May 29, 2014

(30) Foreign Application Priority Data

Nov. 29, 2012 (KR) ........................ 10-2012-0137248

(51) Int. Cl.
*G02F 1/1333* (2006.01)
*G02F 1/1335* (2006.01)

(52) U.S. Cl.
CPC ............. *G02F 1/133308* (2013.01); *G02F 2001/133317* (2013.01); *G02F 2201/54* (2013.01); *G02F 2202/28* (2013.01)

(58) Field of Classification Search
CPC ................................................ G02F 2202/28
See application file for complete search history.

(56) References Cited

U.S. PATENT DOCUMENTS

| 8,068,197 B2* | 11/2011 | Mifune et al. | 349/67 |
| 2003/0071941 A1* | 4/2003 | Mizuno | 349/96 |
| 2005/0243238 A1* | 11/2005 | Cha et al. | 349/58 |
| 2008/0180597 A1* | 7/2008 | Tsai et al. | 349/64 |
| 2009/0086123 A1* | 4/2009 | Tsuji et al. | 349/58 |
| 2011/0199556 A1* | 8/2011 | Oohira | 349/62 |
| 2013/0033660 A1* | 2/2013 | Choi et al. | 349/64 |

FOREIGN PATENT DOCUMENTS

| KR | 10-2008-0057891 A | | 6/2008 |
| KR | 10-2008-0067744 A | | 7/2008 |
| KR | 2009053681 A | * | 5/2009 |
| KR | 10-2009-0100987 A | | 9/2009 |
| KR | 10-2011-0064210 A | | 6/2011 |

OTHER PUBLICATIONS

English translation of KR 2009053681 A, Author: Park J S et al., TitleLiquid Crystal Display Device, Date: May 2009.*

* cited by examiner

*Primary Examiner* — Dung Nguyen
*Assistant Examiner* — Shan Liu
(74) *Attorney, Agent, or Firm* — Lee & Morse, P.C.

(57) ABSTRACT

A liquid crystal display device includes a liquid crystal panel, an adhesive member on a lower surface of the liquid crystal panel, a light guide plate below the adhesive member, an optical sheet between the light guide plate and the liquid crystal panel and a dummy film between the light guide plate and the adhesive member, wherein the adhesive member is discontinuous in an area adjacent to the dummy film.

10 Claims, 8 Drawing Sheets

LIQUID CRYSTAL DISPLAY DEVICE

CROSS-REFERENCE TO RELATED APPLICATION

This application claims priority from Korean Patent Application No. 10-2012-0137248 filed on Nov. 29, 2012 in the Korean Intellectual Property Office, and all the benefits accruing therefrom under 35 U.S.C. §119, the contents of which in its entirety are herein incorporated by reference.

BACKGROUND

1. Field

The present inventive concept relates to a liquid crystal display device and, more particularly, to a liquid crystal display device capable of maintaining the reliability even if temperature and/or humidity changes.

2. Description of the Related Art

With the trend towards thin, light weight portable display devices, e.g., a laptop, a mobile phone, a portable media player, and so forth, as well as household display devices such as televisions, monitors, and so forth, various flat panel display devices are widely used. Flat panel display devices include a display panel for displaying an image, and may be classified into a liquid crystal display device, an organic light-emitting display device, an electrophoretic display device, and the like, depending on the type of the display panel.

The liquid crystal display device may include a liquid crystal panel containing a liquid crystal layer and a polarizing plate. The polarizing plate may be disposed on the upper surface and the lower surface of the liquid crystal panel. The liquid crystal display device can control the movement of liquid crystal particles included in the liquid crystal layer, thereby controlling the state of polarization of light transmitted through the liquid crystal layer. The liquid crystal display device can control the transmittance of light transmitted through the liquid crystal layer by controlling the state of polarization of light transmitted through the liquid crystal layer, thereby displaying an image.

Since the liquid crystal panel cannot emit light on its own, the liquid crystal display device may further include a light source for generating light, a light guide plate for uniformly dispersing the light emitted from the light source to provide the light the liquid crystal panel, and an optical sheet for controlling the optical properties of light emitted from the light guide plate.

The optical sheet and the polarizing plate may be disposed between the light guide plate and the liquid crystal panel. The optical sheet and the polarizing plate may be disposed adjacent to each other. The optical sheet and the polarizing plate may be directly or indirectly connected to each other. The optical sheet and the polarizing plate may expand or contract according to changes in temperature and/or humidity. The deformation, i.e., an expansion rate or contraction rate, of the optical sheet may be different from that of the polarizing plate. If the expansion rate or contraction rate of the optical sheet is different from that of the polarizing plate, and the optical sheet and the polarizing plate are directly or indirectly connected to each other, the contraction or expansion of the optical sheet or polarizing plate may cause a deformation of the other one. For example, the optical sheet may be wrinkled due to the contraction or expansion of the polarizing plate. If the optical sheet or polarizing plate is deformed, the display quality of the liquid crystal display device may be reduced.

SUMMARY

One or more embodiments are directed to providing a liquid crystal display device including a liquid crystal panel, an adhesive member disposed on a lower surface of the liquid crystal panel, a light guide plate disposed below the adhesive member, an optical sheet disposed between the light guide plate and the liquid crystal panel and a dummy film disposed between the light guide plate and the adhesive member, wherein the adhesive member is cut in an area adjacent to the dummy film One or more embodiments are directed to providing a liquid crystal display device including, a liquid crystal panel, a polarizing plate disposed below the liquid crystal panel, a dummy film disposed below the liquid crystal panel, an adhesive member which is adhered to a lower surface of the polarizing plate and a lower surface of the dummy film, and is cut in an area adjacent to the dummy film and a light guide plate disposed below the polarizing plate.

One or more embodiments are directed to providing a liquid crystal display device including, a liquid crystal panel, a polarizing plate disposed below the liquid crystal panel, a first dummy film disposed below the liquid crystal panel, an adhesive member which is adhered to a lower surface of the polarizing plate and a lower surface of the dummy film, an optical sheet disposed between the light guide plate and the liquid crystal panel and a second dummy film disposed between the optical sheet and the adhesive member, wherein the adhesive member is cut in an area adjacent to the first dummy film and the second dummy film.

BRIEF DESCRIPTION OF THE DRAWINGS

The above and other aspects and features will become more apparent by describing in detail exemplary embodiments thereof with reference to the attached drawings, in which.

DETAILED DESCRIPTION

Figure 1:
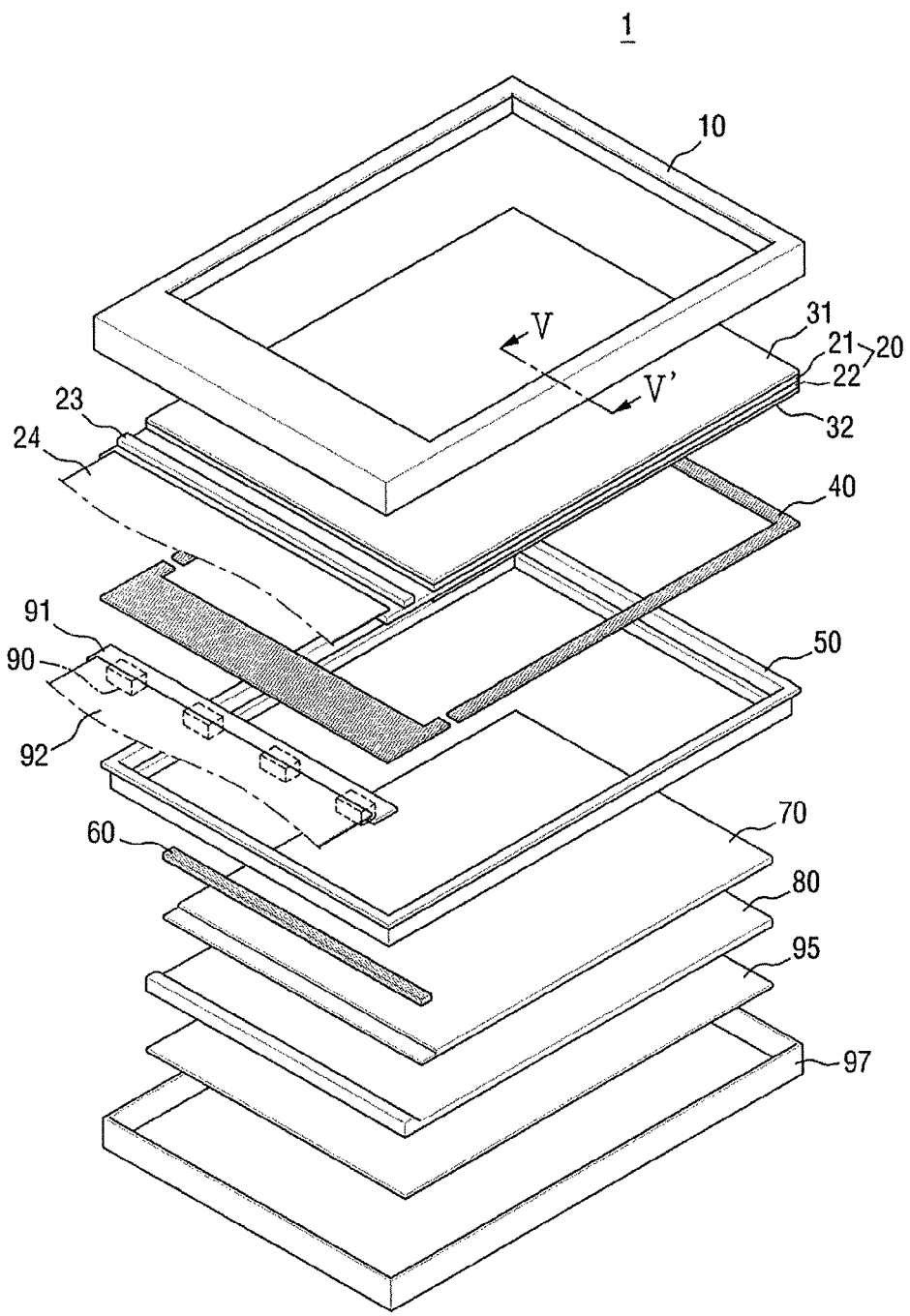
FIG. 1 is an exploded perspective view of a liquid crystal display device in accordance with an embodiment.

Advantages and features of the present inventive concept and methods of accomplishing the same may be understood more readily by reference to the following detailed description of preferred embodiments and the accompanying drawings. The present inventive concept may, however, be embodied in many different forms and should not be construed as being limited to the embodiments set forth herein. Rather, these embodiments are provided so that this disclosure will be thorough and complete and will fully convey the concepts to those skilled in the art. Thus, in some embodiments, well-known structures and devices are not shown in order not to obscure the description with unnecessary detail. Like numbers refer to like elements throughout. In the drawings, the thickness of layers and regions are exaggerated for clarity.

It will be understood that when an element or layer is referred to as being "on," or "connected to" another element or layer, it can be directly on or connected to the other element or layer or intervening elements or layers may be present. In contrast, when an element is referred to as being "directly on" or "directly connected to" another element or layer, there are no intervening elements or layers present. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings herein.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Hereinafter, embodiments will be described in detail with reference to the accompanying drawings.

FIG. 1 is an exploded perspective view of a liquid crystal display device in accordance with an embodiment. Referring to FIG. 1, a liquid crystal display device 1 includes a liquid crystal panel 20, an adhesive member 40, a light guide plate 80, an optical sheet 70, and a dummy film 60.

The liquid crystal panel 20 may include a color filter substrate 21 and a thin film transistor substrate 22. Although not shown, the liquid crystal panel 20 may further include a liquid crystal layer disposed between the color filter substrate 21 and the thin film transistor substrate 22. The thin film transistor substrate 22 includes a plurality of thin film transistors, and the liquid crystal display device can control the arrangement of liquid crystal particles included in the liquid crystal layer through the thin film transistors. The color filter substrate 21 may include color filters. The color filters may be red, blue, and green color filters, but are not limited thereto.

Figure 2:
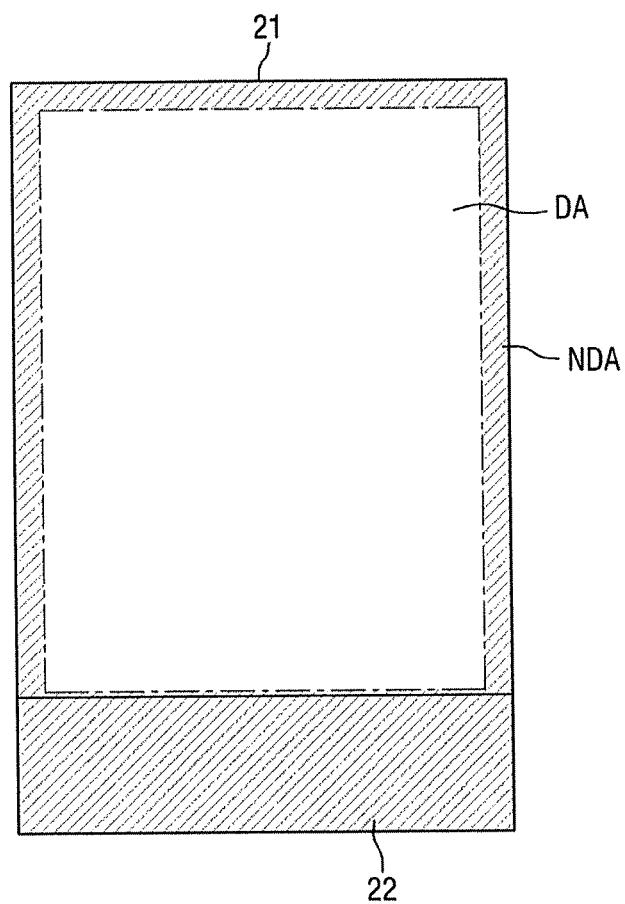
FIG. 2 is a plan view of a liquid crystal panel in accordance with an embodiment.

Hereinafter, the liquid crystal panel 20 will be described in more detail with reference to FIG. 2. FIG. 2 is a plan view of a liquid crystal panel in accordance with an embodiment.

Referring to FIG. 2, the liquid crystal panel 20 may include a display area DA and a non-display area NDA. The display area DA is an area where an image is displayed and the non-display area NDA is an area where an image is not displayed. The display area DA may be disposed in an area where the thin film transistor substrate 22 and the color filter substrate 21 overlap each other. The non-display area NDA may be disposed to surround the display area.

Referring again to FIG. 1, the adhesive member 40 may be disposed below the liquid crystal panel 20. The adhesive member 40 may be a film having an adhesive property on opposing surfaces. The adhesive member 40 can mechanically join the liquid crystal panel 20 with the other components of the liquid crystal display device 1. For example, the adhesive member 40 can join the liquid crystal panel 20 with the dummy film 60 and a mold frame 50 which will be described later.

Figure 3:
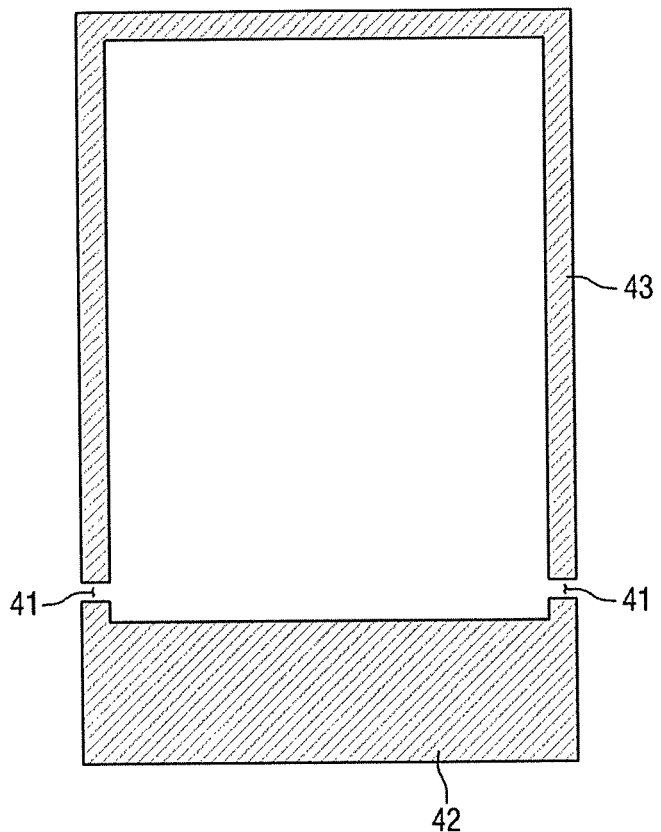
FIG. 3 is a plan view of an adhesive member in accordance with an embodiment.

Hereinafter, the adhesive member 40 will be described in more detail with reference to FIG. 3. FIG. 3 is a plan view of an adhesive member in accordance with an embodiment. Referring to FIG. 3, the adhesive member 40 may have a shape having an open area on the inside. The shape of the open area on the inside of the adhesive member 40 may be a shape corresponding to the display area DA of the liquid crystal panel 20. The adhesive member 40 may be disposed below the non-display area NDA of the liquid crystal panel 20. The adhesive member 40 may not be disposed below the display area DA of the liquid crystal panel 20. The adhesive member 40 can block the light. The adhesive member 40 may have an opaque black color which readily absorbs light in order to easily block the light. The adhesive member may be disposed below the non-display area NDA of the liquid crystal panel 20 to prevent the light emitted from the light guide plate 80 from leaking to the area other than the display area DA of the liquid crystal panel 20.

The adhesive member 40 may have a cut-off shape due to the presence of a cutout portion 41, i.e., the adhesive member 40 may be discontinuous. The cutout portion 41 may be disposed adjacent to the dummy film 60 to prevent the optical sheet 70 from being deformed by expansion or contraction of other components due to a change in humidity and/or temperature, as will be described in detail later. The cutout portion 41 may divide the adhesive member into a first adhesive member 42 and a second adhesive member 43.

Referring again to FIG. 1, the light guide plate 80 is disposed below the liquid crystal panel 20 and the adhesive member 40. The light guide plate 80 may disperse the light provided from a light source 90 which will be described later and provide it to the liquid crystal panel 20. The upper surface of the light guide plate 80 may be formed with a step. A first surface of the upper surface of the light guide plate 80 adjacent to the light source 90 may protrude upward further than other portions of the upper surface, i.e., a second surface. In other words, the second surface of the upper surface of the light guide plate 80 may be further from the liquid crystal panel 20 than the first surface thereof.

The optical sheet 70 may be disposed between the light guide plate 80 and the liquid crystal panel 20. The optical sheet 70 may be disposed below the adhesive member 40. The optical sheet 70 may not be in contact with the adhesive member 40. A portion of the optical sheet 70 may be disposed between the dummy film 60 and the light guide plate 80. The optical sheet 70 may control the optical properties of the light provided to the liquid crystal panel 20 from the light guide plate 80. The optical sheet 70 may include a plurality of layers. For example, the optical sheet 70 may be formed to include at least one of a diffusion layer, a reflective polarizing layer, a phase delay layer and a retardation film layer, but the types of the layers included in the optical sheet are not limited thereto. All the layers included in the optical sheet 70 may not have the same size. In this case, one surface of the optical sheet 70 may be formed with a step.

The optical sheet 70 may contract or expand according to the changes in temperature and/or humidity. If there is a large difference of the contraction rate or expansion rate according to changes in temperature and/or humidity between the optical sheet 70 and other components of the liquid crystal display device 1 connected to the optical sheet 70, the optical sheet 70 may be deformed (e.g., wrinkled). If the optical sheet 70 is deformed, characteristics of the light provided to the liquid crystal panel 20 are changed, which may reduce display quality of the liquid crystal display device 1. The liquid crystal display device 1 includes the adhesive member 40 having the cutout portion 41 formed adjacent to the dummy film 60, thereby reducing the impact on the optical sheet 70 by the contraction or expansion of the other components. Accordingly, deformation of the optical sheet 70 and degradation of the display quality of the liquid crystal display device 1 may be reduced or prevented.

The dummy film 60 may be disposed between the adhesive member 40 and the optical sheet 70. The dummy film 60 may be disposed below the non-display area NDA of the liquid crystal panel 20. The dummy film 60 may be disposed in the area where the thin film transistor substrate 22 and the color filter substrate 21 do not overlap each other. The dummy film 60 may be disposed on the lower surface of the liquid crystal panel 20 on which a polarizing plate 32, which will be described later, is not disposed. The dummy film 60 may be disposed on the upper surface of the light guide plate 80 to be adjacent to the side surface of the light guide plate 80 on which the light source 90 which will be described later is disposed.

Figure 4:
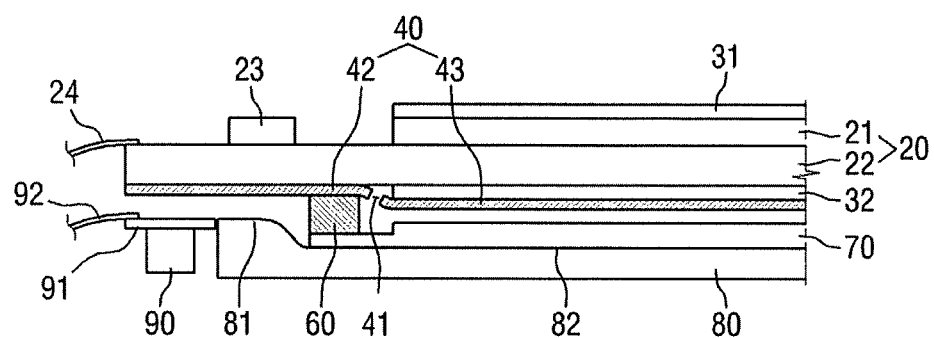
FIG. 4 is a side view showing the arrangement of a liquid crystal panel, a light guide plate, a polarizing plate, an optical sheet, and an adhesive member in accordance with an embodiment.

Hereinafter, the dummy film will be described in more detail with reference to FIG. 4. FIG. 4 is a side view showing the arrangement of the liquid crystal panel 20, the light guide plate 80, the polarizing plate 32, the optical sheet 70, and the adhesive member 40 in accordance with an embodiment. The components not shown in FIG. 4, including the mold frame 50 of the liquid crystal display device 1, which will be described later, have been omitted for simplicity of description.

If the upper surface of the light guide plate 80 is formed with a step, the dummy film 60 may be disposed on a relatively less protruding area in the upper surface of the light guide plate 80. The dummy film 60 can mechanically support the liquid crystal panel 20 to prevent the liquid crystal panel 20 from being bent by gravity due to the step formed on the upper surface of the light guide plate 80 and the step formed on the lower surface of the liquid crystal panel 20 by a second polarizing plate 32, which will be described later. The dummy film 60 may be disposed on the optical sheet 70. If the upper surface of the optical sheet 70 is formed with a step, the dummy film 60 may be disposed on a relatively less protruding area in the upper surface of the optical sheet 70.

In order to prevent the movement of the dummy film 60, the dummy film 60 may be adhered to the adhesive member 40 and the optical sheet 70. The dummy film 60 may be disposed adjacent to the cutout portion 41. The dummy film 60 may be disposed so as not to overlap the cutout portion 41. If the dummy film 60 does not overlap the cutout portion 41, the dummy film 60 may be connected to the first adhesive member 42 of the adhesive member 40 and may not be connected to the second adhesive member 43 of the adhesive member 40. Therefore, by reducing the impact on the optical sheet 70 by the contraction or expansion of other components of the liquid crystal display device 1 connected to the second adhesive member 43 according to the temperature or humidity, deformation of the optical sheet 70 and degradation of the display quality may be reduced or prevented.

According to some embodiments, the dummy film 60 may be adhered to the adhesive member 40 and may not be adhered to the optical sheet 70. If the dummy film 60 is not adhered to the optical sheet 70, it is possible to further reduce the impact on the optical sheet 70 by the contraction or expansion of the other components of the liquid crystal display device 1. According to some other embodiments, if the dummy film 60 is adhered to the adhesive member 40 and is not adhered to the optical sheet 70, the adhesive member 40 may not have a cut-off shape due to the presence of the cutout portion 41. Although the adhesive member 40 does not include the cutout portion 41, if the dummy film 60 is not adhered to the optical sheet 70, the impact on the optical sheet 70 by the contraction or expansion of the other components of the liquid crystal display device 1 is reduced, thereby preventing the deformation of the optical sheet 70 and preventing the degradation of the display quality.

Referring again to FIG. 1, the liquid crystal display device 1 may further include an upper case 10, a driving element 23, a first polarizing plate 31, the second polarizing plate 32, a first ductile (or flexible) circuit substrate 24, the mold frame 50, the light source 90, a light source substrate 91, a second ductile (or flexible) circuit substrate 92, a reflective sheet 95, and a lower case 97.

The upper case 10 may be disposed on the top of the liquid crystal panel 20. The upper case 10 may form an outer frame of the upper and side portions of the liquid crystal display device 1. The upper case 10 may include an opening to expose the liquid crystal panel 20 in the upward direction. The display area DA of the liquid crystal panel 20 may be exposed to the outside through the opening of the upper case 10.

The driving element 23 may drive the liquid crystal panel 20 and control the liquid crystal panel 20 displaying an image. The driving element 23 may be formed to include a timing controller, a gate driver, a data driver, and the like. The driving element 23 may be disposed on the liquid crystal panel 20. For example, the driving element 23 may be disposed on the upper surface of the thin film transistor substrate 22 which does not overlap the color filter substrate 21. According to some embodiments, the driving element 23 may be disposed on the first ductile circuit substrate 24, or disposed on a separate substrate connected to the liquid crystal panel 20.

The first ductile circuit substrate 24 may be connected to the liquid crystal panel 20. The first ductile circuit substrate may be connected to the upper surface of the thin film transistor substrate 22 which does not overlap the color filter substrate 21. The first ductile circuit substrate 24 may provide a path in which the liquid crystal panel 20 and the driving element 23 can transmit/receive a signal to/from the outside. The first ductile circuit substrate 24 may be connected to the liquid crystal panel 20 by an anisotropic conductive film.

The first polarizing plate 31 may be disposed on the upper surface of the liquid crystal panel 20. The first polarizing plate 31 may be disposed on the upper surface of the color filter substrate 21. The first polarizing plate 31 may include a light transmission axis of a first direction, and polarizes light transmitted through the liquid crystal panel 20 in the first direction.

The second polarizing plate 32 may be disposed on the lower surface of the liquid crystal panel 20. The second polarizing plate 32 may be disposed on the lower surface of the thin film transistor substrate 22. The second polarizing plate 32 may be attached to the lower surface of the thin film transistor substrate 22. The second polarizing plate 32 may not cover the entire lower surface of the thin film transistor substrate 22. The second polarizing plate 32 may cover the entire lower part of the display area DA of the liquid crystal panel 20. The second polarizing plate 32 may include a light transmission axis of a second direction, and polarize the light provided to the liquid crystal panel 20 from the optical sheet 70 in the second direction.

The second polarizing plate 32 may be disposed between the adhesive member 40 and the liquid crystal panel 20. The second polarizing plate 32 may be adhered to the adhesive member 40. Referring to FIG. 4, the second polarizing plate 32 may be adhered and connected to the second adhesive member 43 without being directly connected to the first adhesive member 42. The second polarizing plate 32 may have an expansion rate and contraction rate according to the changes in temperature and/or humidity, which are different from those of the optical sheet 70. The liquid crystal display device 1 includes the adhesive member 40 which is divided into the first adhesive member 42 and the second adhesive member 43 by the cutout portion 41, and reduces the impact on the second polarizing plate 32 and the optical sheet 70 by the contraction or expansion thereof according to the changes in temperature and humidity. Thus, deformation of the optical sheet 70 and the second polarizing plate 32, and degradation of the display quality of the liquid crystal display device 1 maybe reduced or prevented.

Figure 5:
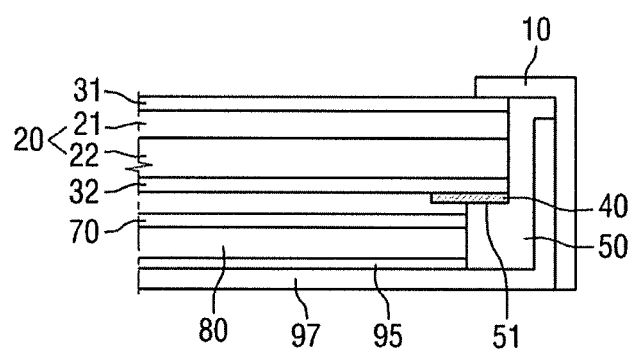
FIG. 5 is a cross-sectional view of the liquid crystal display device taken along line V-V' of FIG. 1.

Referring again to FIG. 1, the mold frame 50 may be formed to surround the side surface of the light guide plate 80 and have an opening. In the opening of the mold frame 50, the light guide plate 80, the optical sheet 70, the light source 90, the dummy film 60, the liquid crystal panel 20, and the second polarizing plate 32 may be disposed. The mold frame 50 may support the components of the liquid crystal display device 1 disposed in the opening. Hereinafter, the mold frame 50 will be described in more detail with reference to FIG. 5. FIG. 5 is a cross-sectional view of the liquid crystal display device taken along line V-V' of FIG. 1.

Referring to FIG. 5, the mold frame 50 includes a support surface 51 at the upper part thereof. The liquid crystal panel 20 may be seated on the support surface 51. The liquid crystal panel 20 may be fastened to the mold frame 50 by attaching the adhesive member 40, which is attached to the lower surface of the second polarizing plate 32 attached to the lower surface of the thin film transistor substrate 22, to the support surface 51.

Referring to FIGS. 1 and 4, the light source 90 may be disposed adjacent to the side surface of the light guide plate 80. The upper surface of the light guide plate 80 may include a first surface 81 which is a relatively more protruding surface in the upward direction, and a second surface 82 which is a relatively less protruding surface in the upward direction. The light source 90 may be disposed adjacent to the protruding first surface 81 of the light guide plate 80. The light source 90 may provide light to the side surface of the light guide plate 80.

The light source substrate 91 may support the light source 90. The light source 90 may be disposed on the light source substrate 91. Although a case where the light source 90 is disposed on the lower surface of the light source substrate 91 has been illustrated in FIGS. 1 and 4, this can be changed according to the embodiments. For example, the light source 90 may be disposed on the upper surface of the light source substrate 91 or may be disposed on the side surface of the light source substrate 91. According to some embodiments, a light source driving element for driving the light source 90 may be disposed on the light source substrate 91.

The second ductile circuit substrate 92 may be connected to the light source substrate 91. The second ductile circuit substrate 92 may function as a path of a signal transmitted to the light source substrate 91.

Referring to FIGS. 1 and 5, the reflective sheet 95 may be disposed below the light guide plate 80. The reflective sheet 95 can reduce loss of light of the light guide plate 80 by reflecting the light emitted downward from the light guide plate 80 such that the light is incident on the light guide plate 80 again.

The lower case 97 may form a lower frame of the liquid crystal display device 1. The components of the liquid crystal display device 1 except for the upper case 10 may be accommodated in the lower case 97. The lower case 97 may include a bottom surface and a side surface extending upward from the perimeter or circumference of the bottom surface. The side surface of the lower case 97 may be disposed more inward, i.e., closer to components to the liquid crystal display device 1 than the side surface of the upper case 10, but embodiments are not limited thereto.

Figure 6:
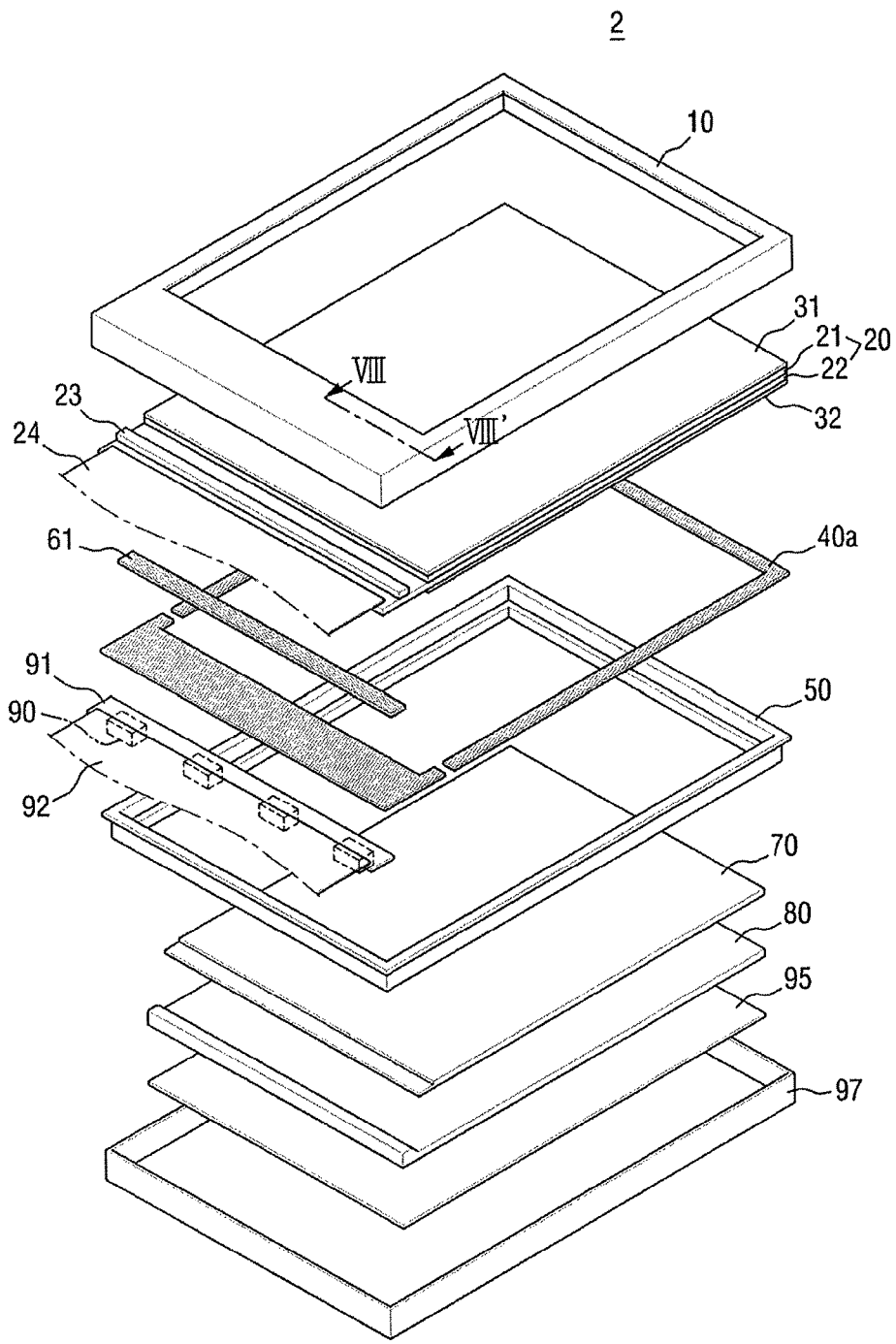
FIG. 6 is an exploded perspective view of a liquid crystal display device in accordance with another embodiment.
Figure 7:
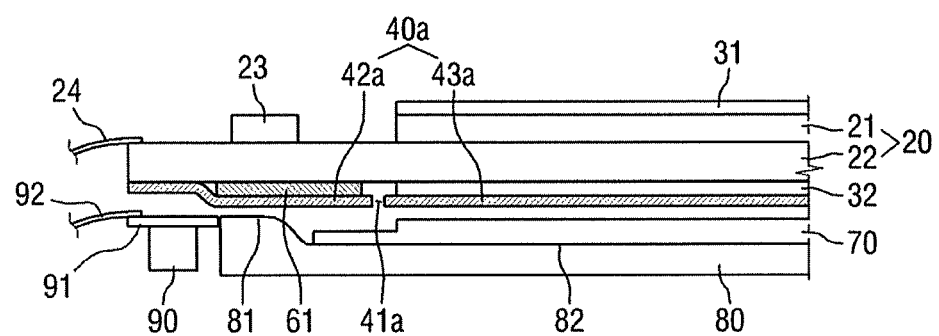
FIG. 7 is a side view showing the arrangement of a liquid crystal panel, a light guide plate, a polarizing plate, an optical sheet and an adhesive member in accordance with another embodiment.
Figure 8:
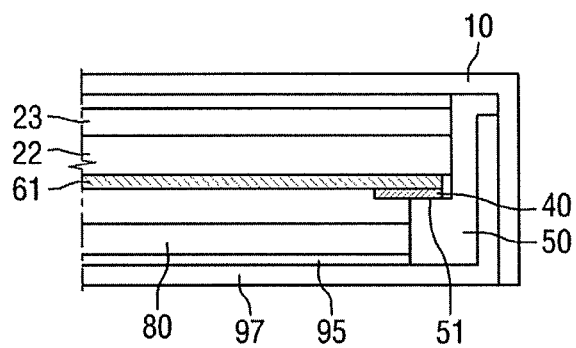
FIG. 8 is a cross-sectional view of the liquid crystal display device taken along line VIII-VIII' of FIG. 6.

Hereinafter, another embodiment will be described with reference to FIGS. 6 to 8. FIG. 6 is an exploded perspective view of a liquid crystal display device in accordance with another embodiment. FIG. 7 is a side view showing the arrangement of the liquid crystal panel, the light guide plate, the polarizing plate, the optical sheet and the adhesive member in accordance with another embodiment. FIG. 8 is a cross-sectional view of the liquid crystal display device taken along line of FIG. 6.

Referring to FIGS. 6 to 8, a liquid crystal display device 2 includes the liquid crystal panel 20, the second polarizing plate 32, the adhesive member 40, the light guide plate 80, and a dummy film 61.

The dummy film 61 may be disposed below the liquid crystal panel 20. The dummy film 61 may be disposed below the non-display area NDA of the liquid crystal panel 20. The dummy film 61 may be disposed so as not to overlap the second polarizing plate 32. The dummy film 61 may support the lower surface of the liquid crystal panel 20. As can be seen from FIG. 8, the dummy film 61 may be seated on the support surface 51 of the mold frame 50 to support the lower surface of the liquid crystal panel 20. The dummy film 61 can prevent the liquid crystal panel 20 from being bent by gravity due to the step between the area where the second polarizing plate 32 is disposed while being attached to the lower surface of the liquid crystal panel 20 and the area where the second polarizing plate 32 is not disposed. The thickness of the dummy film 61 may be substantially equal to the thickness of the first polarizing plate 31. The dummy film 61 may be adhered to the liquid crystal panel 20 and the adhesive member 40. According to some embodiments, the dummy film 61 may be adhered to the adhesive member 40 and may not be adhered to the liquid crystal panel 20.

The adhesive member 40 may be disposed below the dummy film 61 and the second polarizing plate 32. The adhesive member 40 may be adhered to the dummy film 61 and the second polarizing plate 32. As can be seen from FIG. 7, the adhesive member 40 may be divided into the first adhesive member 42 and the second adhesive member 43 by the cutout portion 41. The cutout portion 41 may be formed adjacent to the dummy film 61. The cutout portion 41 may be disposed in the area between the dummy film 61 and the second polarizing plate 32. The first adhesive member 42 may be adhered to the dummy film 61 and may not be adhered to the second polarizing plate 32. The second adhesive member 43 may be adhered to the second polarizing plate 32, and may not be adhered to the dummy film 61. If the first adhesive member 42 is adhered to the dummy film 61, but is not adhered to the second polarizing plate 32, deformation of the second polarizing plate 32 and degradation of the display quality maybe reduced or prevented by reducing the impact on the second polarizing plate 32 by the contraction or expansion of the other components of the liquid crystal display device 2 according to the changes in temperature and/or humidity.

Since the description of the other configuration of the liquid crystal display device 2 is substantially identical to the description of the configuration of the liquid crystal display device 1 in FIGS. 1 to 5, it will be omitted.

The liquid crystal display device 2 may further include the upper case 10, the first polarizing plate 31, the driving element 23, the first ductile circuit substrate 24, the mold frame 50, the optical sheet 70, the light source 90, the light source substrate 91, the second ductile circuit substrate 92, the reflective sheet 95 and the lower case 97. Since the description thereof is substantially identical to the description of the components of the liquid crystal display device 1 which are denoted by the same reference numerals in FIGS. 1 to 5, it will not be repeated.

Figure 9:
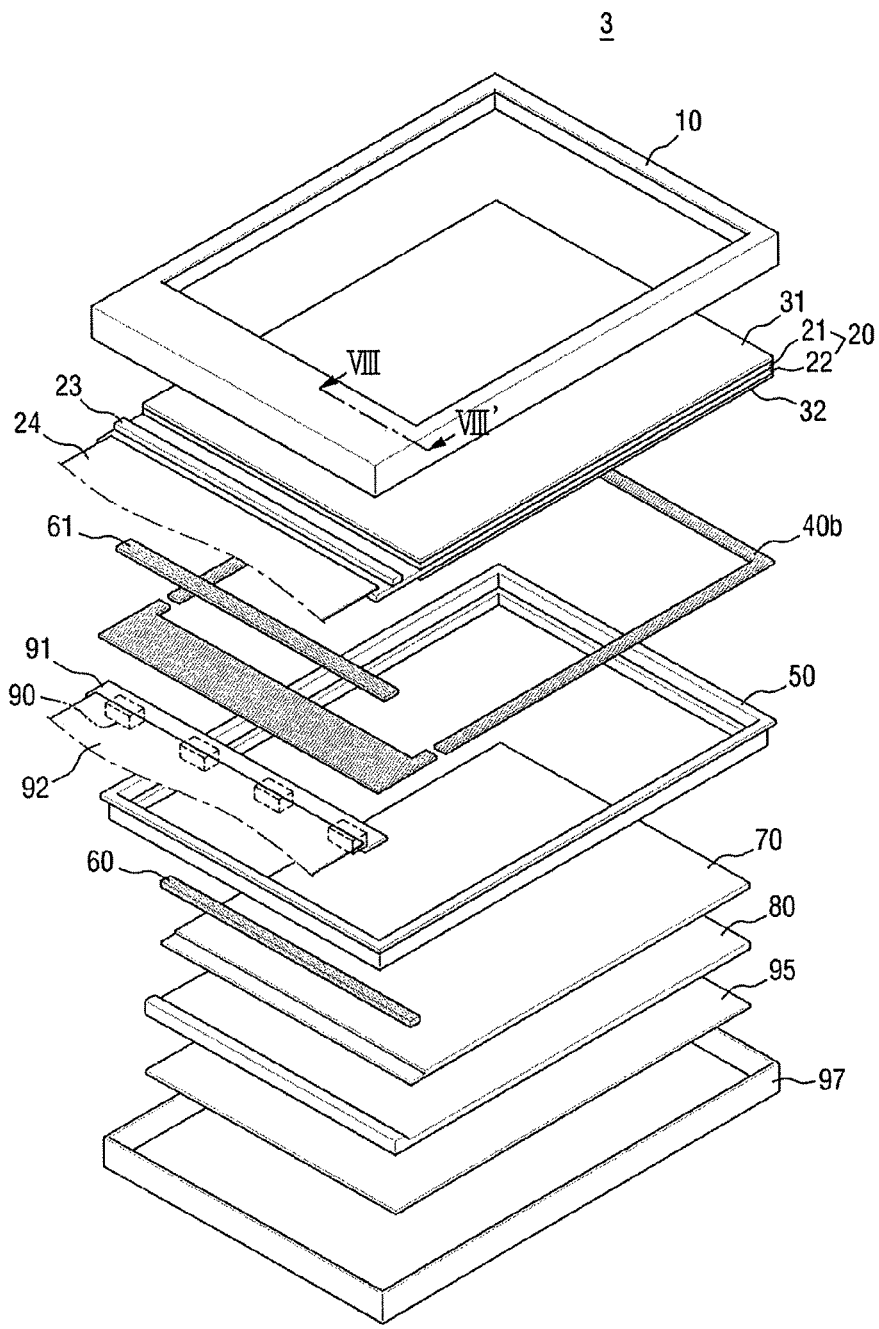
FIG. 9 is an exploded perspective view of a liquid crystal display device in accordance with still another embodiment.
Figure 10:
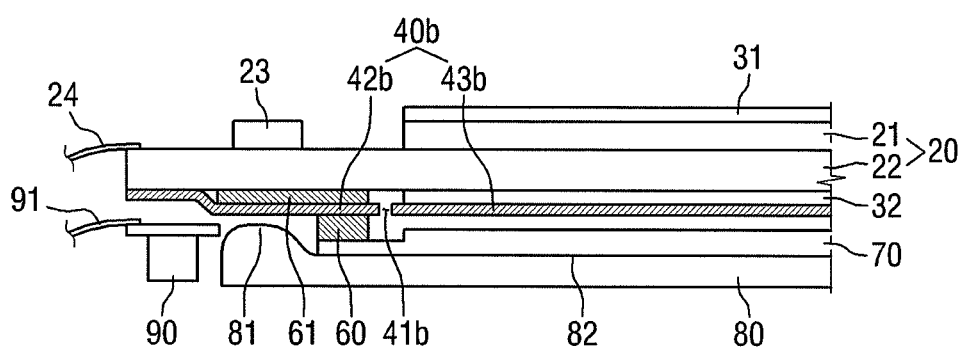
FIG. 10 is a side view showing the arrangement of a liquid crystal panel, a light guide plate, a polarizing plate, an optical sheet, and an adhesive member in accordance with still another embodiment.

Hereinafter, still another embodiment will be described with reference to FIGS. 9 and 10. FIG. 9 is an exploded perspective view of a liquid crystal display device in accordance with still another embodiment. FIG. 10 is a side view showing the arrangement of the liquid crystal panel, the light guide plate, the polarizing plate, the optical sheet, the first adhesive member and the second adhesive member in accordance with still another embodiment.

Referring to FIGS. 9 and 10, the liquid crystal display device 2 includes the liquid crystal panel 20, the second polarizing plate 32, an adhesive member 40b, the light guide plate 80, the optical sheet 70, the first dummy film 60, and the second dummy film 61.

Referring to FIGS. 9 and 10, the first dummy film 60 and the second dummy film 61 may be disposed to overlap each other. The adhesive member 40b may be divided into a first adhesive member 42b and a second adhesive member 43b through a cutout portion 41b formed in the area adjacent to the first dummy film 60 and the second dummy film 61. The first adhesive member 42b may be adhered to the first dummy film 60 and the second dummy film 61, and may not be adhered to the second polarizing plate 32. The second adhesive member 43b may be adhered to the second polarizing plate 32, and may not be adhered to the first dummy film 60 and the second dummy film 61. Therefore, although the second polarizing plate 32 and the optical sheet 70 contract or expand according to the changes in temperature and/or humidity, impact thereon may be reduced, thereby reducing or preventing the deformation of the second polarizing plate 32 and the optical sheet 70, and reducing or preventing the degradation of the display quality.

The remaining description of the first dummy film 60 may be substantially identical to the description of the dummy film 60 in FIGS. 1 to 5. The remaining description of the second dummy film 61 may be substantially identical to the description of the dummy film 60 in FIGS. 6 and 7.

Since the description of the other components of the liquid crystal display device 3 is substantially identical to the description of the liquid crystal display device 1 in FIGS. 1 to 5, it will not be repeated.

The liquid crystal display device 3 may further include the upper case 10, the first polarizing plate 31, the driving element 23, the first ductile circuit substrate 24, the mold frame 50, the light source 90, the light source substrate 91, the second ductile circuit substrate 92, the reflective sheet 95, and the lower case 97. Since the description thereof is substantially identical to the description of the components of the liquid crystal display device 1 which are denoted by the same reference numerals in FIGS. 1 to 5, it will not be repeated.

By way of summation and review, one or more embodiments provide a liquid crystal display device capable of preventing the deformation of an optical sheet or a polarizer plate even if the temperature or humidity changes. One or more embodiments provide a liquid crystal display device capable of preventing the deterioration of the display quality according to the change in temperature or humidity. In particular, one or more embodiments, even though the temperature or humidity is changed, deformation of the optical sheet or polarizing plate can be prevented.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A liquid crystal display device, comprising:
   a liquid crystal panel;
   a polarizing plate below the liquid crystal panel;
   a dummy film below the liquid crystal panel;
   an adhesive member adhered to a lower surface of the polarizing plate and a lower surface of the dummy film, the adhesive member having a discontinuous area adjacent to the dummy film, the discontinuous area of the adhesive member being between the dummy film and the polarizing plate; and
   a light guide plate below the polarizing plate.

2. The liquid crystal display device of claim 1, wherein the liquid crystal panel includes a display area and a non-display area, and
   the adhesive member is disposed below the non-display area.

3. The liquid crystal display device of claim 2, wherein the dummy film is disposed below the non-display area.

4. The liquid crystal display device of claim 1, further comprising:
   a light source adjacent to one side surface of the light guide plate; and
   a mold frame which surrounds side surfaces of the light source and the light guide plate, wherein the mold frame includes a support surface at an upper part,
   wherein the support surface is adhered to the adhesive member.

5. The liquid crystal display device of claim 1, wherein the liquid crystal panel includes:
   a color filter substrate; and
   a TFT substrate below the color filter substrate, the TFT substrate having an area larger than that of the color filter substrate,
   wherein the dummy film is below an area where the TFT substrate and the color filter substrate do not overlap each other.

6. The liquid crystal display device of claim 1, wherein the dummy film is not adhered to the liquid crystal panel.

7. A liquid crystal display device, comprising:
   a liquid crystal panel;
   a polarizing plate below the liquid crystal panel;
   a first dummy film below the liquid crystal panel;
   an adhesive member adhered to a lower surface of the polarizing plate and a lower surface of the first dummy film;
   an optical sheet between a light guide plate and the liquid crystal panel; and
   a second dummy film between the optical sheet and the adhesive member,
   wherein the adhesive member has a discontinuous area adjacent to the first dummy film and the second dummy film, the first dummy film does not overlap the discontinuous area of the adhesive member, and the discontinuous area of the adhesive member is between the first dummy film and the polarizing plate.

8. The liquid crystal display device of claim 7, wherein the first dummy film and the second dummy film overlap.

9. The liquid crystal display device of claim 8, wherein the first dummy film is not adhered to the liquid crystal panel.

10. The liquid crystal display device of claim 8, wherein the second dummy film is not adhered to the optical sheet.

* * * * *